United States Patent Office 3,143,544
Patented Aug. 4, 1964

3,143,544
TRIARYLPHOSPHONIUM CYCLOPENTADIEN-YLIDE METHINE DYES AND PHOTOGRAPH-IC EMULSIONS SENSITIZED THEREWITH
André Emile Van Dormael, Heverlee-Louvain, and Jean Marie Nys and Henri Depoorter, Mortsel-Antwerp, Belgium, assignors to Gevaert Photo-Producten N.V., Mortsel-Antwerp, Belgium, a company of Belgium
No Drawing. Filed Oct. 23, 1959, Ser. No. 848,231
Claims priority, application Great Britain Oct. 24, 1958
1 Claim. (Cl. 260—240)

This invention relates to methine dyes and to methods for their production. It relates also to improvements in photographic emulsions and more particularly to the modification of their photographic properties including sensitization.

It is known to prepare methine dyes starting from compounds containing a reactive methyl- or methylene group, by condensing these compounds with suitable electrophilic intermediates, e.g. with compounds containing in a reactive position a halogen atom, a betahalogenovinyl group, a cyano group, an alkyl- or arylmercapto group, a beta-alkyl- or beta-aryl-mercaptovinyl group, a beta-arylamino-vinyl group, a beta-acetarylidovinyl group, an acylmethylidene group or a thioacylmethylidene group, an alkoxy-methylidene group, an alkyl- or aryl-mercaptomethylidene group, an arylaminomethylidene group, an acetarylido methylidene group, with vinylene homologues of the above mentioned compounds, with heterocyclic or aromatic aldehydes, with orthocarboxylic acid esters, etc.

As compounds with reactive methyl group may be mentioned i.a. the quaternary salts of heterocyclic nitrogen bases, containing a methyl substituent at the carbon atom in the heterocyclic ring which is in the alpha- or gamma-position to the heterocyclic nitrogen atom; as compounds with reactive methylene group may i.a. be mentioned the heterocyclic ketomethylene compounds as well as the compounds containing, in open chain, a methylene group, the reactivity of which is enhanced by the presence of a negative group, such as a cyano group, a carboxylic acid group, a carboxylic acid ester group etc.

It is further known to prepare polymethine dyes starting from compounds containing a pyrrole nucleus by condensing them with one of the aforementioned compounds which are suitable for reaction with compounds containing a reactive methyl- or methylene group.

It is therefore an object of the present invention to provide an entirely new class of polymethine dyes. Another object is to provide methods for making these new polymethine dyes. Still another object is to provide photographic silver halide emulsions sensitized with these new dyes. Other objects will become apparent from a consideration of the following description and examples.

It has now been found that methine dyes of an entirely new class easily can be prepared by condensing a phosphine methylene compound as defined more particularly hereinafter with one of the intermediate compounds capable of reaction with compounds containing a reactive methyl- or methylene group.

The phosphine methylene compounds which, according to the present invention are used in the preparation of the new methine dyes, can be represented as resonance hybrids of the following extreme contributing structures

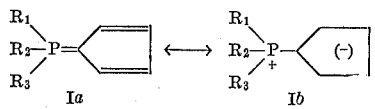

wherein $R_1$, $R_2$ and $R_3$ each represents an aryl radical such as phenyl and halogen substituted phenyl such as bromophenyl (e.g. a mononuclear aryl radical of the benzene series).

From the above formulae, Ia represents the homopolar form of the phosphine-methylene compound with penta-covalent structure for the phosphor atom and Ib summarizes the different possible dipolar forms with tetra-covalent structure for the phosphor atoms, such as

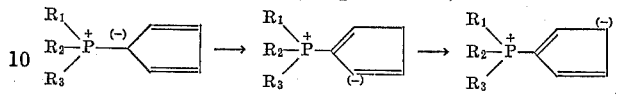

For designating the phosphine methylene compounds the structure of which has been explained just hereinbefore and which could be named cyclopentadienylidene phosphoranes as derivatives of phosphorane $PH_5$, the rather descriptive but generally accepted name phosphoniumcyclopentadienylides will be used in the present invention (see G. Wittig, Experientia 12 (1956) 41 and F. Ramirez et al., Jl. Org. Chem. 22 (1957) 41 and Jl. Am. Chem. Soc. 79 (1957) 67–69.

The phospho-methylidene methine dyes of the present invention can be prepared by condensing a phosphine methylene compound with an electrophilic intermediate such as the cyanine-intermediate compounds capable of reaction with compounds containing a reactive methyl or methylene group.

The phosphonium cyclopentadienylides can be prepared according to F. Ramirez et al. in the above cited literature and in Jl. Amer. Chem. Soc. 79 (1957) 6167, by brominating cyclopentadiene which reaction product is then reacted with a triarylphosphine to obtain bisphosphonium bromides. By treating these bisphosphonium bromides with alkalihydroxide the corresponding phosphonium-cyclopentadienylides are obtained. The reaction scheme is as follows:

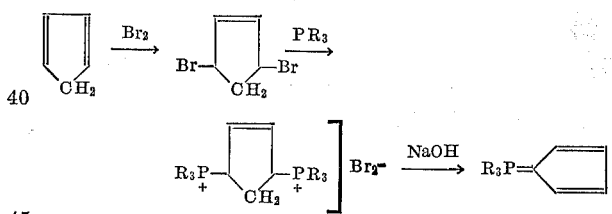

The bisphosphonium salts as well as the corresponding phosphoniumcyclopentadienylides can be applied as starting materials for the preparation of the new methane dyes. It is, however, not necessary to isolate the cyclopenta-dienylide. It can as well be formed in situ in the very synthesis of dye by causing the bisphosphonium salt to react in the presence of a base.

As stated hereinbefore, new methine dyes can be obtained according to the present invention by condensing a phosphonium cyclopentadienylide with a compound capable of reaction with compounds containing a reactive methyl- or methylene group, by application of the usual condensation techniques known to those skilled in the art.

The following more detailed description of some methods for preparing the new methine dyes according to the present invention is not complete and therefore is not to be regarded as limiting the scope of our invention but merely as a survey of the most usual condensation methods.

New asymmetrical methine dye salts can be prepared according to the present invention by condensing a phosphoniumcyclopentadienylide with a cyclammonium quaternary salt represented by the following formula

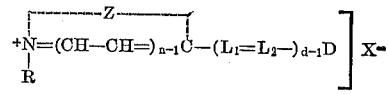

wherein Z constitutes the atoms necessary to complete a member selected from the group consisting of 5-membered and 6-membered nitrogenous heterocyclic systems of the type usual in cyanine dyes such as those of the thiazole series (e.g.

thiazole,
4-methylthiazole,
4-phenylthiazole,
5-methylthiazole,
5-phenylthiazole,
4,5-dimethylthiazole,
4,5-diphenylthiazole,
4-(2-thienyl)-thiazole, etc.), those of the benzothiazole series (e.g.

benzothiazole,
4-chloro-benzothiazole,
5-chloro-benzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
4,5,6,7-tetrahydrobenzothiazole,
5,6-dimethoxybenzothiazole,
5,6-dioxymethylene-benzothiazole,
5-hydroxybenzothiazole,
6-hydroxybenzothiazole,
5,6-dimethylbenzothiazole, etc.), those of the naphthothiazole series (e.g.

alpha-naphthothiazole,
beta-naphthothiazole,
5-methoxy-beta-naphthothiazole,
5-ethoxy-beta-naphthothiazole,
8-methoxy-alpha-naphthothiazole,
7-methoxy-alpha-naphthothiazole, etc.), those of the thionaphtheno-7',6',4,5-thiazole series (e.g.
4'-methoxythionaphtheno-7',6',4,5-thiazole etc.),
those of the oxazole series (e.g.

4-methyloxazole,
5-methyloxazole,
4-phenyloxazole,
4,5-diphenyloxazole,
4-ethyloxazole,
4,5-dimethyloxazole,
5-phenyloxazole, etc.), those of the benzoxazole series (e.g.

benzoxazole,
5-chlorobenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
6-methoxybenzoxazole,
5-hydroxybenzoxazole,
6-hydroxybenzoxazole, etc.), those of the naphthoxazole series (e.g.

alpha-naphthoxazole,
beta-naphthoxazole, etc.), those of the selenazole series (e.g.

4-methylselenazole,
4-phenylselenazole, etc.), those of the benzoselenazole series (e.g.

benzoselenazole,
5-chlorobenzoselenazole,
5-methoxybenzoselenazole,
5-hydroxybenzoselenazole,
4,5,6,7-tetrahydrobenzoselenazole, etc.), those of the naphthoselenazole series (e.g.

alpha-naphthoselenazole,
beta-naphthoselenazole, etc.), those of the thiazoline series (e.g.

thiazoline,
4-methylthiazoline,
4-hydroxymethyl-4-methylthiazoline,
4,4-bis-hydroxymethyl-thiazoline,
4-acetoxymethyl-4-methylthiazoline,
4,4-bis-acetoxymethylthiazoline,
2-benzthiazolylidene-4-thiazolidon etc.), those of the oxazoline series (e.g.

oxazoline,
4-hydroxymethyl-4-methyl-oxazoline,
4,4-bis-hydroxymethyl-oxazoline,
4-acetoxy-methyl-4-methyl-oxazoline,
4,4-bis-acetoxymethyl-oxazoline etc.), those of the selenazoline series (e.g.

selenazoline), those of the 2-quinoline series (e.g.

quinoline,
3-methylquinoline,
5-methylquinoline,
7-methylquinoline,
8-methylquinoline,
6-chloroquinoline
8-chloroquinoline
6-methoxyquinoline,
6-ethoxyquinoline,
6-hydroxyquinoline,
8-hydroxyquinoline etc.), those of the 4-quinoline series (e.g.

quinoline,
6-methoxyquinoline,
7-methylquinoline,
8-methylquinoline etc.), those of the 1-isoquinoline series (e.g.

isoquinoline, 3,4-dihydroisoquinoline etc.), those of the 3-isoquinoline series (e.g.

isoquinoline etc.), those of the 3,3-di-alkylindolenine series (e.g.

3,3-dimethylindolenine,
3,3,5-trimethylindolenine,
3,3,7-trimethylindolenine etc.), those of the pyridine series (e.g.

pyridine,
5-methylpyridine etc.), those of the benzimidazole series (e.g.

1-ethylbenzimidazole,
1-phenylbenzimidazole,
1-ethyl-5,6-dichlorobenzimidazole,
1-hydroxyethyl-5,6-dichlorobenzimidazole,
1-phenyl-3-acetoxyethyl-5,6-dichlorobenzimidazole
1-ethyl-5-chlorobenzimidazole,
1-ethyl-5,6-dibromobenzimidazole,
1-ethyl-2-methyl-5-phenylbenzimidazole,
1-ethyl-2-methyl-5-fluorobenzimidazole,
1-ethyl-2-methyl-5,6-difluorobenzimidazole,
1-ethyl-2-methyl-5-carboxybenzimidazole,
1-ethyl-2-methyl-7-carboxybenzimidazole,
1-ethyl-2-methyl-5-carbethoxybenzimidazole,
1-ethyl-2-methyl-7-carbethoxybenzimidazole,
1-ethyl-2-methyl-5-cyanobenzimidazole,
1-ethyl-2-methyl-5,6-dicyanobenzimidazole,
1-ethyl-2-methyl-5-sulphonamidobenzimidazole,
1-ethyl-2-methyl-5-N-ethyl - sulphonamidobenzimidazole, etc.);

R represents an alkyl radical such as methyl, ethyl, propyl, isopropyl, butyl, isobutyl, allyl (vinyl methyl), beta-hydroxyethyl, benzyl (phenyl methyl), carboxy benzyl, the group —A—CO—O—B—SO$_2$—OH wherein A and B have the same significance as set forth in the co-pending application Ser. No. 742,713, now abandoned, the group —A—W—NH—V—B wherein A, W, V and B have the same significance as set forth in the co-pending application Serial No. 746,347, now abandoned, etc. (e.g. an alkyl radical of the formula $C_pH_{2p+1}$ wherein $p$ represents a positive integer from 1 to 4) an aryl radical such as phenyl, carboxyphenyl, etc. (e.g. a mononuclear aryl radical of the benzene series) or a cycloalkyl radical such as e.g. cyclohexyl; $L_1$ and $L_2$ each represents a methine group such as =CH—, =C.CH$_3$—, =C.C$_2$H$_5$—, =C.C$_3$H$_7$—, =C.CH$_2$C$_6$H$_5$—, =C.C$_6$H$_5$—, =C.O-alkyl—, =C.S-alkyl—, =C.Se-alkyl—, =C.O-acyl—,

=C.COO—C$_2$H$_5$—, =C.NR'R"—, =C.NHCOR'

=C.CONHR' (wherein R' and R" are hydrogen or have the same significance as set forth above for R), =C.CONHC$_6$H$_5$—, =C.(CH=)$_r$D— wherein D represents a heterocyclic radical, and $r$ represents 0 or a positive integer from 1 to 6, or a methine group which forms part of a heterocyclic or isocyclic ring such as e.g. a cyclopentadiene ring; $n$ represents the positive integer 1 or 2; $d$ represents a positive integer from 1 to 9, and X represents an acid radical of the type used in the cyanine dyes such as chloride, bromide, iodide, perchlorate, benzene sulphonate, p-tolusulphonate, acetate, methylsulphate, ethylsulphate etc.

The condensation is advantageously carried out in the presence of a basic condensing agent, e.g. a trialkylamine such as triethylamine, a dialkylaniline, a heterocyclic tertiary amine such as pyridine, N-alkyl-piperidine or the like. The condensation can also be carried out in the presence of an inert diluent such as methanol, ethanol, acetone, 1,4-dioxane etc., occasionally but not necessarily in the presence of a basic condensing agent as set forth.

New asymmetrical methine dye salts can also be prepared according to the present invention by condensing a phosphonium cyclopentadienylide of the Formula I above with a heterocyclic compound of the formula

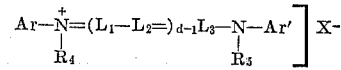

wherein Z, R, $n$, $L_1$, $L_2$ and $d$ have the same significance as set forth above and G represents an oxygen, sulphur or selenium atom or an imino group such as a phenylimino group. The condensation is carried out in the presence of an acid anhydride such as acetic anhydride.

New symmetrical methine dye salts can be prepared according to the present invention by condensing a phosphonium cyclopentadienylide of the Formula I above with an ortho-carboxylic acid alkyl ester such as ethyl orthoformiate and ethyl orthoacetate, in the presence of a carboxylic acid anhydride, e.g. acetic anhydride.

New symmetrical methine dye salts can also be prepared according to the invention by condensing a phosphonium cyclopentadienylide with a compound of the formula:

$$\left[Ar-\overset{+}{\underset{R_4}{N}}=(L_1-L_2=)_{d-1}L_3-\underset{R_5}{N}-Ar'\right]X^-$$

wherein $L_1$, $L_2$, X and $d$ have the same significance as set forth above, Ar and Ar' each represents an aryl radical such as phenyl, etc. (e.g. a mononuclear aryl radical of the benzene series), $R_4$ and $R_5$ each represents a hydrogen atom or an alkyl-, aryl- or cycloalkyl radical, an acyl radical such as acetyl or an aryl sulphonyl radical such as p-tolusulphonyl; $L_3$ represents a methine group such as those described for $L_1$ and $L_2$. The condensation is advantageously carried out in the presence of a basic condensing agent as set forth above and/or an inert diluent as set forth above.

New symmetrical methine dye salts can also be pre-prepared according to the invention by condensing a phosphonium cyclopentadienylide with the anil base of the compound of the last above mentioned formula hereinbefore

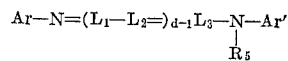

in the presence of an acid anhydride such as acetic anhydride, as the case may be in the presence of a basic condensing agent as set forth above.

New styryl dye salts can be prepared according to the present invention by condensing a phosphonium cyclopentadienylide of the Formula I above with an aromatic or heterocyclic aldehyde such as dialkyl amino benzaldehyde, carbazolaldehyde, phenothiazine aldehyde etc., in the presence of a carboxylic acid anhydride e.g. acetic anhydride and of a basic condensing agent as set forth above.

The following prepartions are illustrative of the invention. The formulae and nomenclature given therein are thought to be correct and are included for the guidance of those skilled in the art, but should they later be found to require some modification, it must be understood that the compounds dealt with are sufficiently defined by their mode of preparation, irrespective of what their true structure may be.

*Preparation 1*

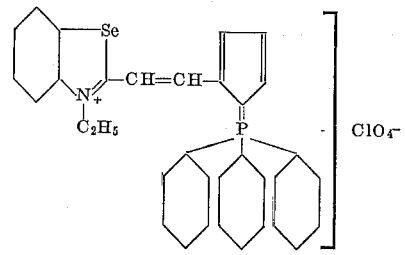

1.6 g. 2-(beta-phenylimino-ethylidene) - 3-ethyl-benzoselenazoline, 1.6 g. of triphenyl phosphonium-cyclopentadienylide (prepared as described in Jl. Amer. Chem. Soc. 79 (1957) 6173) and 20 cm.³ of acetic anhydride were stirred for 1 h. at room temperature. Ether was added to the reaction mixture to give a precipitate which was dissolved in ethanol. The dye was precipitated as perchlorate and it had a melting point of 150–151° C. after three recrystallizations from ethanol. Absorption maximum: 522 mμ.

Preparation 2

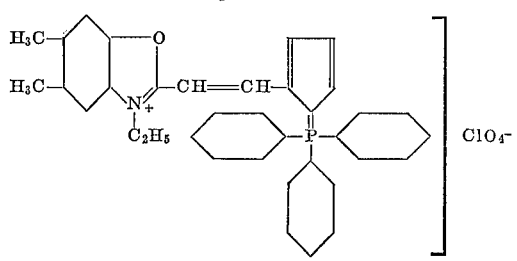

1.45 g. of 2-(beta-phenylimino-ethylidene)-3-ethyl-5,6-dimethylbenzoxazoline, 1.6 g. of triphenylphosphonium cyclopentadienylide and 25 cm.³ of acetic anhydride were stirred for 30 min. at room temperature and for another 10 min. at reflux temperature. Ether was added to the cooled reaction mixture to give a precipitate which was dissolved in ethanol. The dye was precipitated as perchlorate and it had a melting point of 284° C. after three recrystallizations from ethanol. Absorption maximum: 480 mμ.

Prepartion 3

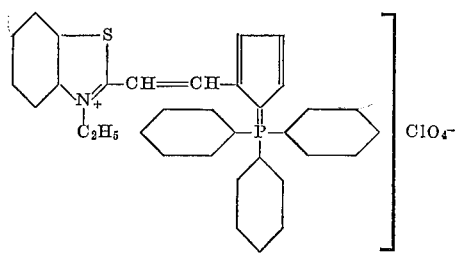

2.35 g. of 2-beta-(N-p-tolusulpho-anilino)-vinyl-3-ethylbenzothiazolinium iodide, 1.6 g. of triphenylphosphonium cyclopentadienylide and 20 cm.³ of ethanol were heated together for 20 min. at boiling temperature. Ether is added to the cooled reaction mixture to give a precipitate which was dissolved in ethanol. The dye was precipitated as perchlorate and it had a melting point of 150° C. after three recrystallizations from ethanol. Absorption maximum: 515 mμ.

Preparation 4

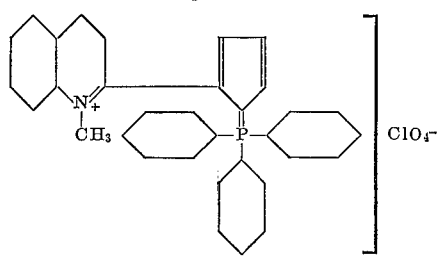

3.0 g. of 1-methyl-2-methylmercapto-quinolinium methylsulphate, 3.25 g. of triphenylphosphonium cyclopentadienylide, 30 cm.³ of ethanol and 1.4 cm.³ of triethylamine were heated together for 30 min. at boiling temperature. Ether was added to the cooled reaction mixture to give a precipitate which was dissolved in ethanol. The dye was precipitated as converted perchlorate and recrystallized twice from ethanol. Melting point: 192°. Absorption maximum: 445 mμ.

Preparation 5

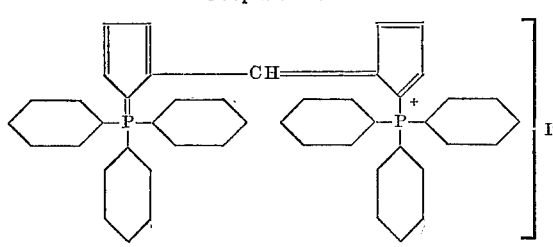

6.5 g. of triphenyl phosphonium cyclopentadienylide, 6.5 cm.³ of triethyl-o-formiate, 30 cm.³ of acetic anhydride are refluxed for 20 min. Ether was added to the cooled reaction mixture to give a precipitate which was dissolved in ethanol. The dye was precipitated as iodide, and it had a melting point 249–250° C. after three recrystallizations from ethanol. Absorption maximum: 487 mμ.

Preparation 6

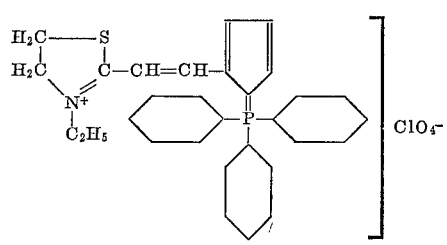

3.5 g. of 2-(beta-acetanilidovinyl)-3-ethyl-thiazolinium-bromide, 3.2 g. of triphenyl phosphonium cyclopentadienylide and 60 cm.³ of ethanol were kept for 3 h. at room temperature, and thereafter refluxed for 5 min. Ether was added to the cooled reaction mixture to give a precipitate which was dissolved in ethanol. The dye was precipitated as perchlorate and recrystallized from ethanol. Melting point: 218° C. Absorption maximum: 460 mμ.

Preparation 7

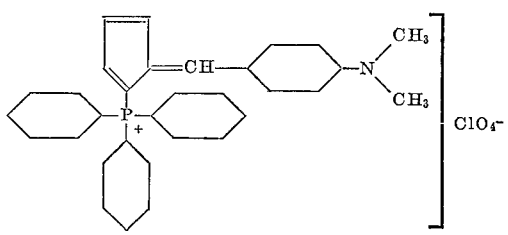

0.75 g. of p-dimethylamino benzaldehyde, 1.6 g. of triphenyl phosphonium cyclopentadienylide, 25 cm.³ of acetic anhydride and 1.4 cm.³ of triethylamine were refluxed for 30 min. The mixture was cooled, diluted with ether and the precipitated dye converted into perchlorate and purified by two recrystallizations from ethanol. Melting point: 250° C. Absorption maximum: 495 mμ.

Preparation 8

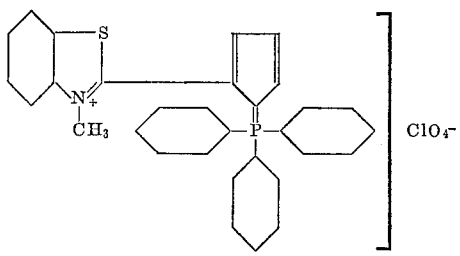

1.5 g. of 2-methylmercapto-3-methylbenzothiazolium methylsulphate, 1.65 g. of triphenyl phosphonium cyclopentadienylide, 15 cm.³ of ethanol and 1.4 cm.³ of triethylamine were refluxed for 30 min. After chilling, the dye was precipitated with ether, converted into perchlorate by dissolving in ethanol and treating with an aqueous sodium perchlorate solution and recrystallized four times from ethanol. Melting point: 242° C. Absorption maximum: 398 mμ.

Preparation 9

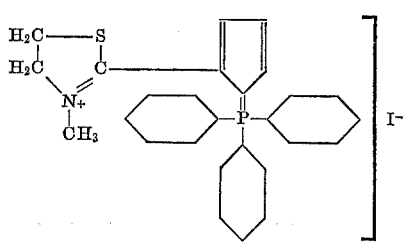

1.4 g. of 2-methylmercapto-3-methylthiazolinium iodide, 1.65 g. of triphenyl phosphonium cyclopentadienylide, 20 cm.³ of ethanol and 1.4 cm.³ of triethylamine were heated at reflux for 30 minutes. The mixture was cooled and diluted with ether. The precipitated dye was dissolved in ethanol, poured into a potassium iodide solution and recrystallized three times from ethanol. Melting point: 210° C. Absorption maximum: 346 mμ.

Preparation 10

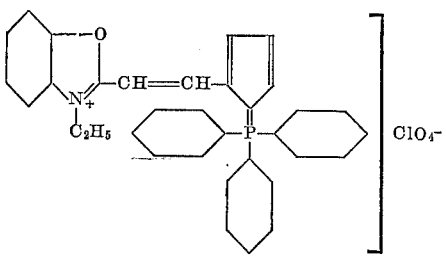

1.3 g. of 2-(β-phenylimino-ethylidene)-3-ethylbenzoxazoline, 1.6 g. of triphenylphosphonium cyclopentadienylide, 20 cm.³ of acetic anhydride were stirred 1 h. at room temperature. The dye was precipitated by dilution with ether, taken up in ethanol, reprecipitated with a sodium perchlorate solution and purified by recrystallizing three times from ethanol. Melting point: above 250° C. Absorption maximum: 480 mμ.

Preparation 11

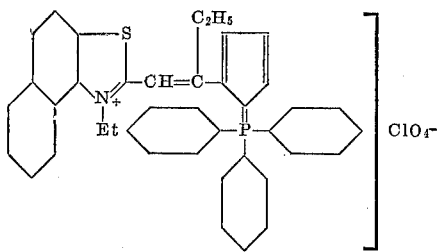

2.1 g. of 2-(β-methylmercapto-β-ethylvinyl)-3-ethylnaphtho-(1,2-d)thiazolium methylsulphate, 1.6 g. of triphenylphosphonium cyclopentadienylide, 20 cm.³ of ethanol and 1.4 cm.³ of triethylamine were refluxed for 15 minutes, chilled and diluted with ether. The dye was converted as usual into perchlorate and recrystallized three times from ethanol. Melting point: 160° C. Absorption maximum: 542 mμ.

Preparation 12

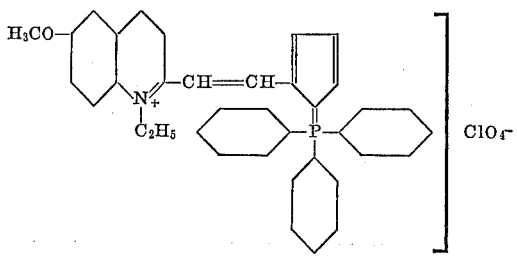

1.5 g. of 1-ethyl-2-(β-phenylimino-ethylidene)-6-methoxy-1,2-dihydroquinoline, 1.6 g. of triphenylphosphonium cyclopentadienylide and 20 cm.³ of acetic anhydride were heated at boiling temperature for 10 min., cooled and diluted with ether. The dye was converted into perchlorate and recrystallized three times from ethanol. Melting point: 210° C. Absorption maximum: 550 mμ.

Preparation 13

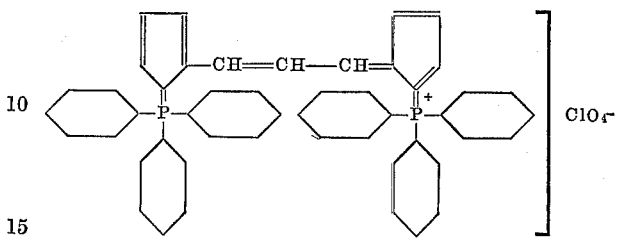

1.35 g. of γ-anilino-acroleine anil hydrochloride, 3.25 g. of triphenylphosphonium cyclopentadienylide, 25 cm.³ of acetic anhydride and 1.4 cm.³ of triethylamine were stirred at room temperature for 1 h., ether was added and the precipitated dye converted into perchlorate. Purification was performed by 3 crystallizations from ethanol. Melting point: 244° C. Absorption maximum: 597 mμ.

Preparation 14

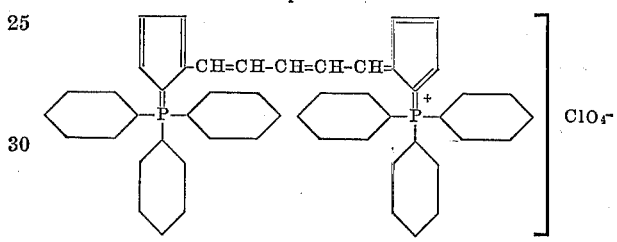

1.4 g. of glutaconaldehyde dianilhydrochloride, 3.25 g. of triphenylphosphonium cyclopentadienylide and 25 cm.³ of acetic anhydride were stirred for 15 min. at 75° C. The mixture was cooled and diluted with ether. The precipitated dye was converted into perchlorate and crystallized three times from ethanol. Melting point: above 250° C. Absorption maximum: 695 mμ.

Preparation 15

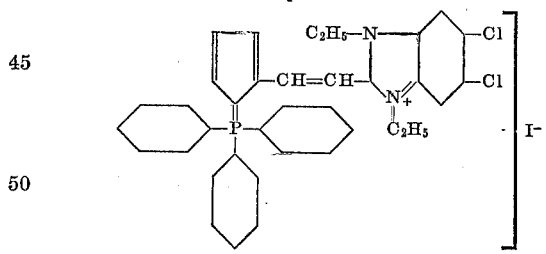

2.75 g. of 1,3-diethyl-2-[β-(N-p-tolusulphonyl-anilino)-vinyl-]5,6-dichlorobenzimidazolium chloride, 1.65 g. of triphenylphosphonium cyclopentadienylide, 25 cm.³ of pyridine and 1.4 cm.³ of triethylamine were refluxed for 30 minutes, cooled and diluted with ether. The precipitated dye was converted into iodide with potassium iodide and recrystallized three times from ethanol. Melting point: >260°. Absorption maximum: 482 mμ.

Preparation 16

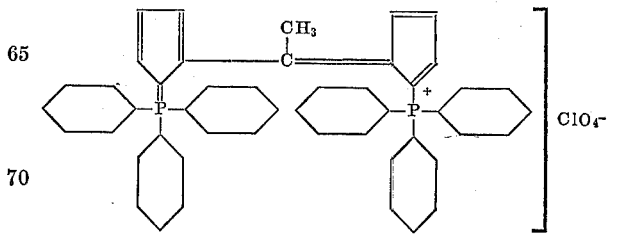

3.25 g. of triphenylphosphonium cyclopentadienylide, 3.3 cm.³ of ethyl-ortho-acetate and 30 cm.³ of acetic anhydride were refluxed for 30 minutes, cooled and diluted with ether. The precipitate was dissolved in ethanol and poured out into a sodium perchlorate solution. The dye was purified by three recrystallizations from ethanol. Melting point: 160°. Absorption maximum: 488 mµ.

*Preparation 17*

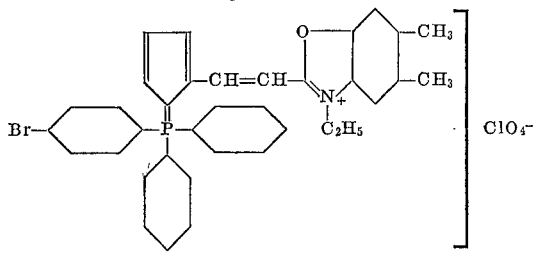

9.2 g. of cyclopentadiene are cooled at —40° C. in 12 cm.³ of chloroform. 22.4 g. of bromine dissolved in 7 cm.³ of chloroform is added dropwise with stirring and under nitrogen atmosphere whilst the temperature is kept at —40 to —30° C. At this temperature and under nitrogen atmosphere, 96 g. of p-bromophenyl diphenyl phosphine, (prepared according to H. Gilman and G. E. Brown, J. Am. Chem. Soc. 67 (1945) 824), dissolved in 100 cm.³ of chloroform is added dropwise. The temperature is slowly raised to room temperature and next the solution is refluxed for 5 hours. The chloroform is evaporated to dryness and the very viscous residue obtained consisting of the dibromide salt of bis(p-bromophenyl diphenyl-phosphonium)-cyclopentadienylide can further directly be used for the synthesis of the dyestuff.

If it is desired to isolate the phosphorylide, this residue is dissolved in 50 cm.³ of methanol and alkalized with sodium hydroxyde 5 N. The oily product obtained is dissolved in methanol, cautiously precipitated with ether, sucked off, washed with a mixture of methanol and ether and recrystallized from isopropanol. Melting point: 215° C.

The dye is then prepared as in Preparation 2 but 1.6 g. of triphenylphosphonium cyclopentadienylide is replaced by 2 g. p-promophenyl diphenyl phosphonium cyclopentadienylide. Melting point: 220° C. Absorption maximum: 485 mµ.

*Preparation 18*

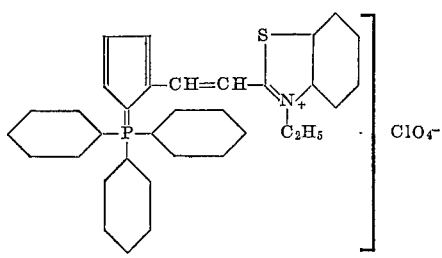

This dye is prepared as in Preparation 3 but 1.6 g. of triphenyl phosphonium cyclopentadienylide are replaced by 2 g. of p-bromophenyl diphenylphosphonium cyclopentadienylide prepared as in Preparation 17. Absorption maximum: 519 mµ.

*Preparation 19*

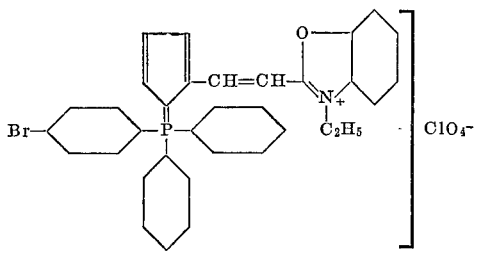

This dye is prepared as in Preparation 10 but 1.6 g. of triphenyl phosphonium cyclopentadienylide are replaced by 2 g. of p-bromophenyl diphenyl phosphonium cyclopentadienylide prepared as in preparation 17. Absorption maximum: 478 mµ.

The new methine dyes which can be prepared according to the present invention belong to an entirely new class of methine dyes, which we tentatively have termed phosphomethylidene methine dyes, and which are characterized by the auxochromophore-system (see C.E.K. Mees, The Theory of the Photographic Process, New York, 1945, p. 373)

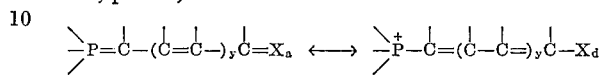

wherein X is an atom (or group of atoms) of a kind that can readily raise (or lower) its covalency by one, whereby $X_a$ acts as an electron-acceptor and $X_d$ as an electron-donor and $y$ is 0 or a positive integer. Having regard to the known electron-acceptor and electron-donor atoms, $X_d$ may be e.g. a negatively charged oxygen atom (—O⁻) or a tertiary nitrogen atom

and $X_a$ may be e.g. a double bonded oxygen atom (=O) or a quaternary nitrogen atom

It is evident, however, that the conjugated chain may also be terminated at both ends by a phospho-methylidene group according to the invention, viz., $X_a$ may be the group

and $X_d$ may be the group

As shown in the above system, each dye molecule can be represented by different structural formulae, differing only in the way the bonding electrons are paired, and corresponding with different possible structures for the dye molecule. According to the resonance theory, these structures have no real existence, and the dye molecule is to be considered as being a resonance hybrid of the different contributing structures.

Although in most cases many other possible contributing structures are to be taken into account over the two extreme structures shown in the systems mentioned hereinbefore, for practical purposes the dye molecule is represented as a resonance hybrid of only two extreme structures.

Within the hereinbefore described new broad class of dyes there are important sub-classes; some typical sub-classes will now be given by way of example (the structure of the dyes is explained by giving only one structural formula corresponding to one of the different possible electromeric extreme structures).

(I) The dyes of the general formula

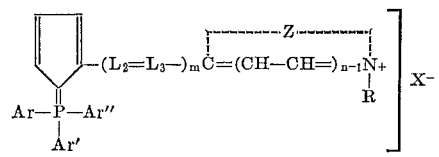

wherein $L_2$, $L_3$, R, X, Z and $n$ have the same significance as set forth hereinbefore, Ar, Ar' and Ar" each represents a member of the group consisting of a phenyl nucleus and a halogen substituted phenyl nucleus such as bromophenyl, and $m$ represents a positive integer of from 0 to 3.

(II) The dyes of the general formula

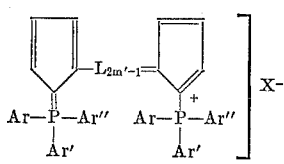

wherein Ar, Ar', Ar'' and X have the same significance as set forth hereinbefore, L represents a methine group such as those set forth for $L_2$ and $L_3$ and $m'$ represents a positive integer from 1 to 4.

(III) The dyes of the general formula

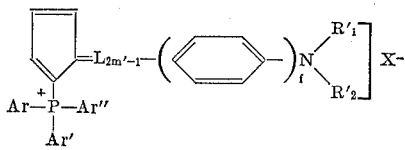

wherein Ar, Ar', Ar'', L, X and $m'$ have the same significance as set forth hereinbefore and $R'_1$ and $R'_2$ each represents a lower alkyl, an aryl such as methyl, ethyl and propyl, an aryl or cycloalkyl radical or form together with N an heterocyclic ring such as e.g. piperidine or morpholine nucleus, and $f$ represents the positive integer 1 or 2.

From the above description of the most important sub-classes included within the new class of the phosphomethylidene methine dyes clearly appears that the extent of the class of the phosphomethylidene methine dyes according to the invention and the number of the dyes included therein are comparable to the well-known classes of cyanine and merocyanine dyes which are known since years and are still in development. In this way, the new class of the phosphomethylidene methine dyes according to the invention does also include i.a. the phosphomethylidene methine dyes in the conjugated methine chain of which one or more methine groups are replaced by a nitrogen atom to give the corresponding aza-dyes.

The phosphomethylidene methine dyes of the present invention can be prepared by condensing a phosphine methylene compound with an electrophilic intermediate such as the cyanine-intermediate compounds capable of reaction with compounds containing a reactive methyl or methylene group.

Among the new phosphomethylidene methine dyes typical sub-classes of which are listed above, some comprise phosphomethylidene methine dyes which show interesting sensitizing properties for photographic light-sensitive silver halide emulsions. The most suitable representatives for this purpose are given by the general formula of sub-class I above.

The sensitizing dyes of our present invention are characterized thereby that they contain an entirely new color conferring system. Indeed, according to the nature of their auxochromophores (C. E. K. Mees, The Theory of the Photographic Process, New York, 1954, p. 373) the dyes which have hitherto been used as optical sensitizers can be grouped into three main classes:

(1) The dyes containing the amidinium-system

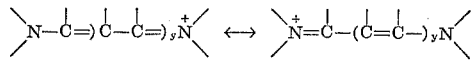

comprising i.a. the cyanine dyes, the styryl dyes, the neocyanine dyes, the hemicyanine dyes, the triphenylmethane dyes such as malachite green and the acridine dyes such as acridine orange.

(2) The dyes containing the formiate-ion system

comprising i.a. the oxonol dyes and the phthaleine dyes such as erythrosine.

(3) The dyes containing the amide-system

comprising i.a. the merocyanine dyes and the polymerocyanine dyes or dyes wherein two or more of the aforementioned systems are combined in one dye-molecule such as in the rhodacyanines, and that one or more methine groups in the conjugated chain may be replaced by a nitrogen atom to give the corresponding aza-dyes.

The main characteristic of the dyes of the three classes mentioned hereinbefore is the presence in their molecule of a conjugated chain terminated by atoms (or groups of atoms) of a kind that can readily raise (or lower) their covalency by one. In the above systems, the transition from one electromeric extreme structure into another involves next to a reversal of the sequence of double and single linkages a raising of the state of covalency by one of the atom which is in the lower state of covalency and a lowering of the state of covalency by one of the atom which is in the highest state of covalency. This transition is accompanied with a transfer of an electric charge from one end of the chain to the other, whereby the atom in the lower state of covalency acts as electron-donor and the atom in the higher state of covalency acts as an electron-acceptor.

It is generally known that only very few elements are capable of acting as electron acceptor or donor at the end of a conjugated chain in such a way that a dye-conferring system is obtained.

The choice of such elements which, because of an unsaturated electron pair, can function in two neighbouring states of covalency is virtually restricted to nitrogen, oxygen and sulphur (L. Brooker, Spectroscopy, Ann. Rev. Phys. Chem. 2 (1951) 123).

It is therefore a merit of the present invention for having surprisingly found that color-conferring systems can also be obtained by terminating the conjugated chain by the group —C=P— as electron-donor and/or by the group

as electron-acceptor group.

As stated hereinbefore some phosphomethylidene methine dyes of the present invention can be used for controlling or modifying the spectral sensitivity of photographic emulsions. In this way, some new phosphomethylidene methine dyes according to the present invention may be used for extending the spectral sensitivity of photographic silver halide emulsions, the natural sensitivity to light of which is restricted to a short range of wave lengths in the ultraviolet and/or violet and/or blue regions of the spectrum, to light of other wave lengths, or for enhancing the natural sensitivity in a well defined part of the spectrum, e.g. in the blue range. Since as shown in the above description there is an extraordinary number of dyes falling within the scope of the present invention; one of the great advantages of the present invention is that we have provided an unusually comprehensive range of sensitizers extending over the whole spectrum.

For optically sensitizing photographic silver halide emulsions by using one or more of the phosphomethylidene methine dyes according to the present invention, the dye or dyes can be incorporated in the photographic emulsion by one of the methods customarily employed in the art. In practice, it is convenient to add the dyes to the emulsion in the form of a solution in an appropriate solvent. The dyes are advantageously incorporated in the finished, washed emulsions and should be uniformly distributed throughout the emulsion. The concentration of the dyes in the emulsion can vary widely, for example from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion making.

The dyes may, if desired, also be added to the emulsion by the well-known expedient of bathing the coated emulsion in a solution of the dye.

The new polymethine dyes can be incorporated in photographic emulsions the general sensitivity of which has been increased by physical and chemical ripening. As suitable chemical sensitizers may be mentioned the well-known sulphur sensitizers such as allylisothiocyanate, allylthiourea and sodium thiosulphate, potassium selenocyanide and the natural sensitizers originating in the gelatin, reducing sensitizers such as the imino-aminomethane sulphinic acid and the derivatives thereof, the salts of noble metals such as gold, platinum and palladium and the polyoxyalkylene derivatives.

The photographic emulsions optically sensitized according to the invention may further be supersensitized and/or hypersensitized by one of the methods known to those skilled in the art.

In preparing the photographic emulsions according to the invention, the usual addenda such as antifogging agents, stabilizers, anti-bronzing agents, hardeners, wetting agents, plasticizers, development accelerators, color couplers, fluorescent brighteners and ultraviolet screening compounds can moreover be incorporated in the emulsion in the manner customarily employed in the art.

Emulsions sensitized with the new polymethine dyes can be coated in the usual manner on a suitable support such as glass, cellulose derivative film, resin film or paper.

The following examples are illustrative of the invention. In view of a good surveyability, they are given in a table. The dyes of the different preparations have been incorporated in silver halide emulsions with gelatin as binding agent.

| Dye of preparation | Kind of silver halide | Quantity of dye added per kg. emuls., mg. | Sensitization maximum in $m\mu$ | Sensitization range in $m\mu$ |
|---|---|---|---|---|
| 1 | Chlorobromide | 30 | 565 | to 600 |
| 2 | Bromide | 30 | 520 | 565 |
| 3 | Bromochloride | 50 | 560 | 605 |
| 4 | Chloride | 100 | 480 | 510 |
| 5 | Bromide | 30 | | 510 |
| 6 | Chloride | 30 | 490 | 520 |
| 8 | do | 100 | 425 | 445 |
| 10 | Chlorobromide | 30 | 515 | 540 |
| 11 | Bromoiodide | 30 | 580 | 625 |
| 12 | Chlorobromide | 30 | 570 | 625 |
| 15 | do | 20 | 520 | 550 |
| 17 | Bromide | 30 | 525 | 570 |
| 18 | do | 30 | 565 | 610 |
| 19 | Chlorobromide | 30 | 515 | 540 |

Although, as shown in the above examples, the new phosphomethylidene methine dyes are useful especially for extending the spectral sensitivity of the customarily employed gelatino silver chloride, gelatino silver chlorobromide, gelatino silver bromide, gelatino silver bromoiodide and gelatino silver chlorobromoiodide emulsions, photographic emulsions containing water-permeable colloids other than gelatin, such as agar-agar, zeine, collodion, water-soluble cellulose derivatives, polyvinyl alcohol or other hydrophilic synthetic or natural resins or polymeric compounds, may equally well be sensitized according to the present invention.

From the sensitization characteristics shown in the above examples clearly appears that the phosphomethylidenemethine dyes of the present invention are useful, not only in the preparation of orthochromatic and panchromatic emulsions for black-and-white photography and cinematography, including emulsions to be used in the graphic and document reproduction field or for X-ray photography by means of fluorescent screens, but also where different emulsions are required having different sensitivities to different colors (as distinct from general sensitivity over the whole spectrum) such as e.g. for use in multi-layer or multi-particle films for color photographic purposes.

Some of the phospho-methylidene methine dyes of the present invention have also been found to enhance the sensitivity of photographic silver halide emulsions, for long wave length radiations such as infrared rays, for short wave length radiations such as e.g. X-rays and $\gamma$-rays or for corpuscular rays such as $\alpha$-rays and $\beta$-rays.

It has further been found that by using some of the phosphomethylidene methine dyes of the present invention, in combination with some other particular dyes belonging to the known classes or to our new class of methine dyes, a supersensitizing effect is obtained.

Some of the phosphomethylidene methine dyes prepared according to the present invention have been found to be also very useful for other applications involving an energy-transfer, e.g. in electro-photographic systems as photoconductors or for modifying the spectral sensitivity of the usual photoconductors such as ZnO, in photopolymerization processes etc.

Some other phosphomethylidene methine dyes of the present invention, especially those containing a nitro-substituent, have been found to decrease the sensitivity of silver halide emulsions to light of the longer wave lengths and can therefore be used as desensitizers in photographic emulsions, or in photographic baths for facilitating the treatment of the exposed photographic materials, or for increasing the contrast in direct positive emulsions, e.g. as described in our British specification No. 821,251.

Further applications for some of the phosphomethylidene methine dyes prepared according to the present invention can be found in the medical and clinical field, in the plastics industry for preventing the polymeric substances from deterioration by U.V. radiation in the packaging field in the preparation of U.V. radiation absorbent transparent sheets, in the photographic industry, apart from the already mentioned application for modifying the spectral sensitivity of photographic silver halide emulsions, for light-screening and/or U.V. radiation absorbing purposes in photographic materials for black-and-white or color photography, e.g. in anti-abrasion, filter or antihalation layers, or in light-sensitive silver halide emulsion layers.

We claim:

A polymethine dye selected from the group consisting of those represented by the following formulae:

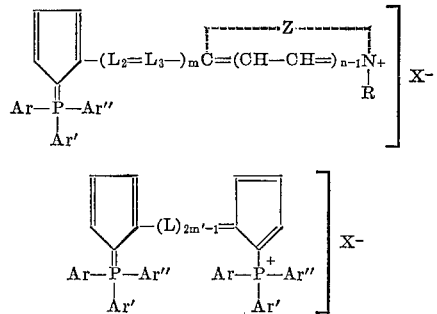

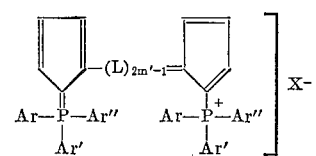

wherein

L, $L_2$ and $L_3$ each represents a member selected from the group consisting of methine, ethyl substituted methine, and methyl substituted methine, Ar, Ar' and Ar" each represents a member selected from the group consisting of

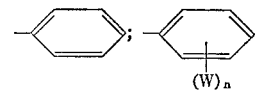

where W is halogen,

Z constitutes the non-metallic atoms necessary to complete a nitrogenous heterocyclic nucleus selected from the group consisting of a thiazole nucleus, a benzothiazole nucleus, a naphthothiazole nucleus, a thionaphtheno-thiazole, an oxazole nucleus, a benzoxazole nucleus, naphthoxazole nucleus, selenazole nucleus, benzoselenazole nucleus, naphthoselenazole nucleus, thiazoline nucleus, thiazolidine nucleus, oxazoline nucleus, oxazolidine nucleus, selenazoline nucleus, quinoline nucleus, isoquinoline nucleus, dialkylindolenine nucleus, pyridine nucleus and benzimidazole nucleus, X is an acid radical of the type used in the cyanine dyes, R represents a lower alkyl radical, $m$ represents a positive integer selected from the group consisting of 0, 1 and 2, $m'$ represents a positive integer selected from the group consisting of 1, 2, 3 and 4, and $n$ represents a positive integer selected from the group consisting of 1 and 2.

References Cited in the file of this patent

UNITED STATES PATENTS

| | | |
|---|---|---|
| 2,153,169 | Brooker | Apr. 4, 1939 |
| 2,691,581 | Knott | Oct. 12, 1954 |
| 2,715,622 | Gerzon et al. | Aug. 16, 1955 |
| 2,838,504 | Crounse | June 10, 1958 |
| 2,914,522 | Ramirez | Nov. 24, 1959 |
| 2,930,814 | Ramirez | Mar. 29, 1960 |

OTHER REFERENCES

Chemical Abstracts, 16, 3101 (1922).
Chemical Abstracts, 19, 530 (1925).